US012663027B2

(12) United States Patent
Deeg et al.

(10) Patent No.: US 12,663,027 B2
(45) Date of Patent: Jun. 23, 2026

(54) RELAY VALVE FOR A COMPRESSED AIR SYSTEM FOR A VEHICLE

(71) Applicant: KNORR-BREMISE Systeme fuer Nutzfahrzeuge GmbH, Munich (DE)

(72) Inventors: Markus Deeg, Eberdingen (DE); Michael Giannuzzi, Kirchheim am Neckar (DE); Friedbert Roether, Cleebronn (DE)

(73) Assignee: KNORR-BREMSE Systeme für Nutzfahrzeuge GmbH, Munich (DE)

( * ) Notice: Subject to any disclaimer, the term of this patent is extended or adjusted under 35 U.S.C. 154(b) by 5 days.

(21) Appl. No.: 19/001,498

(22) Filed: Dec. 25, 2024

(65) Prior Publication Data

US 2025/0237238 A1     Jul. 24, 2025

(30) Foreign Application Priority Data

Jan. 22, 2024    (DE) ......................... 102024101695.7

(51) Int. Cl.
| | |
|---|---|
| *F15B 13/044* | (2006.01) |
| *B60T 15/18* | (2006.01) |
| *F16K 31/122* | (2006.01) |
| *B60T 15/02* | (2006.01) |

(52) U.S. Cl.
CPC ............ *F15B 13/044* (2013.01); *B60T 15/18* (2013.01); *F16K 31/1226* (2013.01); *B60T 15/027* (2013.01)

(58) Field of Classification Search
CPC ...... F15B 13/044; B60T 15/18; B60T 15/027; F16K 31/1226
See application file for complete search history.

(56) References Cited

U.S. PATENT DOCUMENTS

| | | | | |
|---|---|---|---|---|
| 9,988,032 | B2 * | 6/2018 | Sieker ................... | B60T 15/182 |
| 2021/0316707 | A1 * | 10/2021 | Roether ............... | B60T 15/027 |

FOREIGN PATENT DOCUMENTS

| | | |
|---|---|---|
| DE | 60222209 T2 | 5/2008 |
| DE | 102016111098 A1 | 12/2017 |
| DE | 102016117593 | 7/2019 |
| DE | 102022113946 A1 | 6/2022 |
| EP | 1844999 A1 | 2/2007 |
| EP | 3060439 B1 | 9/2014 |
| EP | 261498081 | 3/2015 |
| EP | 3847063 B1 | 8/2019 |

* cited by examiner

*Primary Examiner* — John Bastianelli
(74) *Attorney, Agent, or Firm* — Von Rohrscheidt Patents

(57)  ABSTRACT

A relay valve for a compressed air system of a vehicle, the relay valve comprising: a housing including a pressure medium inlet arranged at or in the housing and connectible with a compressed air source, at least one pressure medium outlet connectible with a consumer, at least one control inlet, at least one vent towards an ambient atmosphere, and at least one relay valve piston movably supported in the housing along an axis, wherein the relay valve piston includes a radially outer rim and a center pass through opening, wherein a support tube of the housing protrudes into the center pass through opening, wherein the relay valve piston is movably supported by the radially outer rim at a radially inner wall of the housing and movably supported by a radially inner circumferential surface of the center pass through opening at a radially outer circumferential surface of the support tube.

19 Claims, 3 Drawing Sheets

RELAY VALVE FOR A COMPRESSED AIR SYSTEM FOR A VEHICLE

RELATED APPLICATIONS

This application claims priority from German patent application DE 10 2024 101 695.7, filed on Jan. 22, 2024, which is incorporated in its entirety by this reference.

FIELD OF THE INVENTION

The invention relates to a relay valve for a compressed air system of a vehicle according to the preamble of claim 1, and an electropneumatic module, including a relay valve, according to claim 17, a compressed air system of a vehicle, including an electropneumatic module according to claim 18, and a vehicle including a compressed air system according to claim 19.

BACKGROUND OF THE INVENTION

A generic relay valve is known from EP 1 844 999 A1. The seal arrangement included therein includes a first seal element that is fixed in a groove at a radially outer edge of an annular portion of the relay valve piston and which seals relative to a radially inner wall of the housing, and a second seal element which is fixed in a recess at a support tube of the housing and which seals relative to a radially outer circumferential surface of the support tube. Thus, the first seal element includes a dynamically operated first sealing surface which seals relative to the radially inner wall of the housing and a static second sealing surface which seals relative to the groove in the radially outer edge. The second seal element also includes a dynamic (moving) third sealing surface which seals relative to the radially outer wall of the support tube and a static fourth sealing surface which seals relative to the recess at the radially outer circumferential surface of the support tube. Thus, the number of the static and dynamic sealing locations is relatively high, thus a total of at least four sealing surfaces is required which causes relatively high fabrication and assembly complexity of the relay valve.

BRIEF SUMMARY OF THE INVENTION

Thus, it is an object of the invention to provide a relay valve that offers simpler fabrication and assembly. By the same token, an electropneumatic module including the relay valve, a compressed air system of a vehicle including the electropneumatic module and a vehicle with the compressed air system shall be provided.

This object is achieved by the features of the independent claims. Advantageous embodiments can be derived from the dependent claims.

The relay valve according to the invention is an air volume augmenting, pneumatically controlled valve and controls large compressed air volumes using small compressed air volumes, e.g. for brake cylinders of a compressed air brake of a vehicle. Thus, the relay valve includes a relay valve piston that operates as a control piston which is loadable on one side through a control chamber with a control pressure and loadable on the other side through an operating chamber and a pressure medium outlet connected therewith with an operating pressure provided by a consumer. An inlet valve is arranged between a venting chamber that is connectable through a pressure medium inlet with a pressure medium source and an operating chamber connectible through the pressure medium outlet with the consumer. An outlet valve is arranged between the operating chamber and a vent that connects to the atmosphere.

The relay piston moves into the operating chamber when the control chamber is loaded with a control pressure. Moving the relay valve piston initially closes the outlet valve and subsequently opens the inlet valve. This builds up a pressure in the operating chamber which counteracts the control pressure at the relay valve piston. The relay valve piston is pulled back against its original movement when the counteracting pressures are in equilibrium. The inlet valve closes without the outlet valve opening so that the pressure in the operating chamber and under the pressure medium outlet is maintained. Venting the control chamber moves the relay valve piston further against its original movement direction, and the outlet valve opens until the pressure in the operating chamber has dropped to a level where a force equilibrium at the relay valve piston is maintained and the outlet valve is closed again. When the control chamber is vented completely, the operating chamber and the subsequent consumers are also vented completely.

The relay valve can be integrated into a valve arrangement together with additional components. Thus, the valve arrangement can be e.g., an electronic air processing device, an electropneumatic part brake module, or an electropneumatic control module.

The invention discloses a relay valve for a compressed air system of a vehicle, the relay valve comprising:

a) a housing, including a pressure medium inlet arranged at or in the housing and connectible with a compressed air source, at least one pressure medium outlet connectible with a consumer, at least one control inlet, at least one vent towards an ambient atmosphere, and at least one relay valve piston movably supported in the housing along an axis, b) wherein the relay valve piston includes a radially outer rim and a center pass through opening, wherein a support tube of the housing protrudes into the center pass through opening, c) wherein the relay valve piston is moveably supported with the radially outer rim at an inner radial wall of the housing and moveably supported with a radially inner circumferential surface of the center pass through opening at a radially outer circumferential surface of the support tube, and d) wherein a seal arrangement is provided which seals the relay valve piston on one side relative to the radially inner wall of the housing and on another side relative to the radially outer circumferential surface of the support tube, in particular dynamically.

The radially inner wall of the housing envelops the support tube and the relay valve piston e.g., in the circumferential direction.

The Relay Valve is Characterized in that e) the seal arrangement includes at least one seal element, advantageously a single seal element including a first sealing surface and a second sealing surface, in particular oriented away from the first sealing surface in a direction perpendicular to the axis, wherein the seal element is configured to seal the relay valve piston with the first sealing surface relative to the radially inner wall of the housing and with the second sealing surface relative to the radially outer circumferential surface of the support tube.

The seal element is a seal element which performs a sealing function on one side with the first sealing surface and the second sealing surface, but the seal element also performs a limited support function supporting the relay valve piston at the radially inner wall of the housing and at the radially outer circumferential surface of the support tube of the housing. The first sealing surface and/or the second sealing surface can include at least one sealing lip in order to perform the sealing function and optionally to additionally also perform the support function. The at least one seal element can therefore be advantageously configured as a lip seal.

The seal element of the seal arrangement advantageously provides the only, in particular dynamic, seal between the relay valve piston on one side and the radially outer circumferential surface of the support tube and the radially inner wall of the housing.

Then, the at least one seal element, advantageously the single seal element of the seal arrangement, is exclusively arranged or fixed at the relay valve piston, and in particular all sealing surfaces of the seal element are configured at the relay valve piston. Then, the same seal element and in particular the single seal element of the seal arrangement, performs an advantageous double function in that it provides the first sealing function and simultaneously also provides the second sealing function. The support tube can be configured e.g. as a smooth cylinder. Additionally, only three sealing surfaces are required, namely, the first and the second (dynamic) sealing surfaces recited supra and a third static sealing surface which is configured and provided to prevent compressed air from migrating under the seal element relative to the relay valve piston. Overall, this provides a significant fabrication and assembly simplification for the relay valve.

Thus, a dynamic sealing surface is a sealing surface that is moved relative to another element. This applies to the first sealing surface of the seal element, which is moved in particular parallel to the axis relative to the radially inner wall of the housing and also to the second sealing surface of the seal element, which is moved in particular parallel to the axis relative to the radially outer circumferential surface of the support tube. A static sealing surface, however, is a sealing surface which is not moveable relative to the element that supports the static sealing surface. This applies in particular to the third sealing surface which is supported by the relay piston and configured and provided to prevent compressed air from migrating under the seal element relative to the relay valve piston.

Advantageously, at least the first sealing surface and the second sealing surface are essentially arranged at the same level with respect to the axis. The axis can then be in particular a central longitudinal axis of the relay valve.

A particularly good connection between the relay valve piston and the at least one seal element is achieved when the at least one seal element is connected with the relay valve piston by positive form locking. Then the connection between the relay valve piston and the at least one seal element can be provided in particular without an adhesion enhancement agent.

In order to further simplify fabrication and assembly of the relay valve, the seal element can form an injection molded part made from at least one synthetic material and/or at least one elastomeric material which is integrally injection molded with at least a section of the relay valve piston. Then, the at least one seal element forms an integral one-piece unit together with the relay valve piston, wherein the integral one-piece unit can be mounted in the housing in a single assembly step.

The seal element can be configured as a single layer injection molded part, viewed in cross section so that the seal element is moldable in its entirety in a single injection molding step. This variant advantageously fabricates the seal element in a quick and simple manner.

Alternatively, the at least one seal element can be configured as an injection-molded part with multiple layers in cross section, wherein one respective layer of the plural layers in generated respectively by a separate injection molding step. The multi-layer configuration facilitates using different materials for producing the at least one seal element. For example, the first layer can form a solid carrier layer made from a first material with a first elasticity modulus which is e.g. greater than a second elasticity modulus of a second layer made from a second material, wherein the second layer is e.g. in direct contact with the first sealing surface with the radially inner circumferential surface of the housing and with the second sealing surface in direct contact with the radially outer circumferential surface of the support tube.

Advantageously, the at least one seal element configured as an injection molded part can envelop the section of the relay valve piston recited supra at least partially and/or protrude into at least one opening of a section of the relay valve piston or also protrude through the at least one opening. Thus, at least one opening section of the opening can be parallel to the axis. Embodiments are also feasible where at least one undercut is provided between the section of the relay valve piston and the at least one seal element due to the penetration of one or plural openings of the section of the relay valve piston by the at least one seal viewed in cross section, wherein the undercut then provides positive form locking of the at least one seal element with the section of the relay valve piston. Also in this case, an adhesion enhancement agent between the at least one seal element and the section of the relay valve piston can be omitted.

Even without this opening of the relay valve piston, an undercut or a positive form locking of the at least one seal element with the section of the relay valve piston can be provided, e.g., in that at least the section of the relay valve piston is enveloped and/or encased by the at least one seal element through injection molding.

As stated supra, the seal element can include a third sealing surface which is configured and provided to prevent an undercutting of the seal element by compressed air in the portion of the section of the relay valve piston.

Particularly advantageously, the relay valve piston includes a tube section including the center inner pass-through opening and an annular portion that protrudes radially outward from the tube section wherein the radially outer rim is configured at a radial outside of the annular portion. Thus, the annular portion can advantageously form the section of the relay valve piston recited supra. The radially inner wall of the housing advantageously envelops the annular portion and the tubular portion of the relay valve piston viewed in the circumferential direction.

The annular portion can include a first face and a second face oriented perpendicular to the axis, wherein the seal element covers at least a portion of the first face and/or of the second face. Also this can form an undercut between the seal element and the section of the relay valve piston. Additionally, the seal element can also form an elastic stop surface for the relay valve piston with respect to the housing when the relay valve piston contacts a section of the housing, in particular in at least one end position of the relay valve piston with the first face and/or the second face of the relay valve piston.

The tubular portion of the relay valve piston can also be configured hollow and can form a part of the venting channel that is connected with the vent of the relay valve.

Particularly advantageously, the first dynamic sealing surface and the second dynamic sealing surface seal a control chamber of the relay valve connected with the control input relative to an operating chamber of the relay valve connected with the pressure medium outlet and seal the control chamber of the relay valve relative to the venting chamber of the relay valve. Advantageously, the seal element forms the only, in particular, dynamic seal, between the control chamber, the operating chamber, and the venting chamber.

As stated supra, the first sealing surface and/or the second sealing surface of the seal element can include at least one seal lip which then cooperates with the radially inner circumferential surface of the wall of the housing or with the radially outer circumferential surface of the support tube.

The seal lip is advantageously oriented at an acute angle relative to a plane that is orthogonal to the axis, so that a preload is provided relative to the surface that is to be sealed.

An improved sealing effect is achieved when at least the first sealing surface includes two seal lips arranged at a distance from each other along a direction of the axis in an advantageous embodiment, wherein an intermediary space between the two sealing lips is connected through an internal channel of the relay valve piston with the vent. The reason behind this arrangement is that the seal lip is arranged at a slant angle as recited supra, and a particular amount of preload against the surface to be sealed is required for a sufficient sealing effect, thus, e.g., relative to the radially inner wall of the housing. This preload of the seal lip can be generated by a sufficient pressure differential between the control chamber and the operating chamber which, however, is rarely provided. Connecting the intermediary space between the two seal lips with the vent and thus with atmosphere generates a pressure differential between the intermediary space and the operating chamber on one side and the control chamber on the other side, wherein the pressure differential is sufficient to preload the two slanted seal lips against the radially inner wall of the housing and thus increase the sealing effect.

The invention also provides and electropneumatic module of a compressed air system of a vehicle which includes at least one relay valve as described supra and a compressed air system of a vehicle which includes at least one electropneumatic module, and a vehicle including the compressed air system.

BRIEF DESCRIPTION OF THE DRAWINGS

The invention is now described based on advantageous embodiments with reference to drawing figures, wherein"

DETAILED DESCRIPTION OF THE INVENTION

Figure 1:
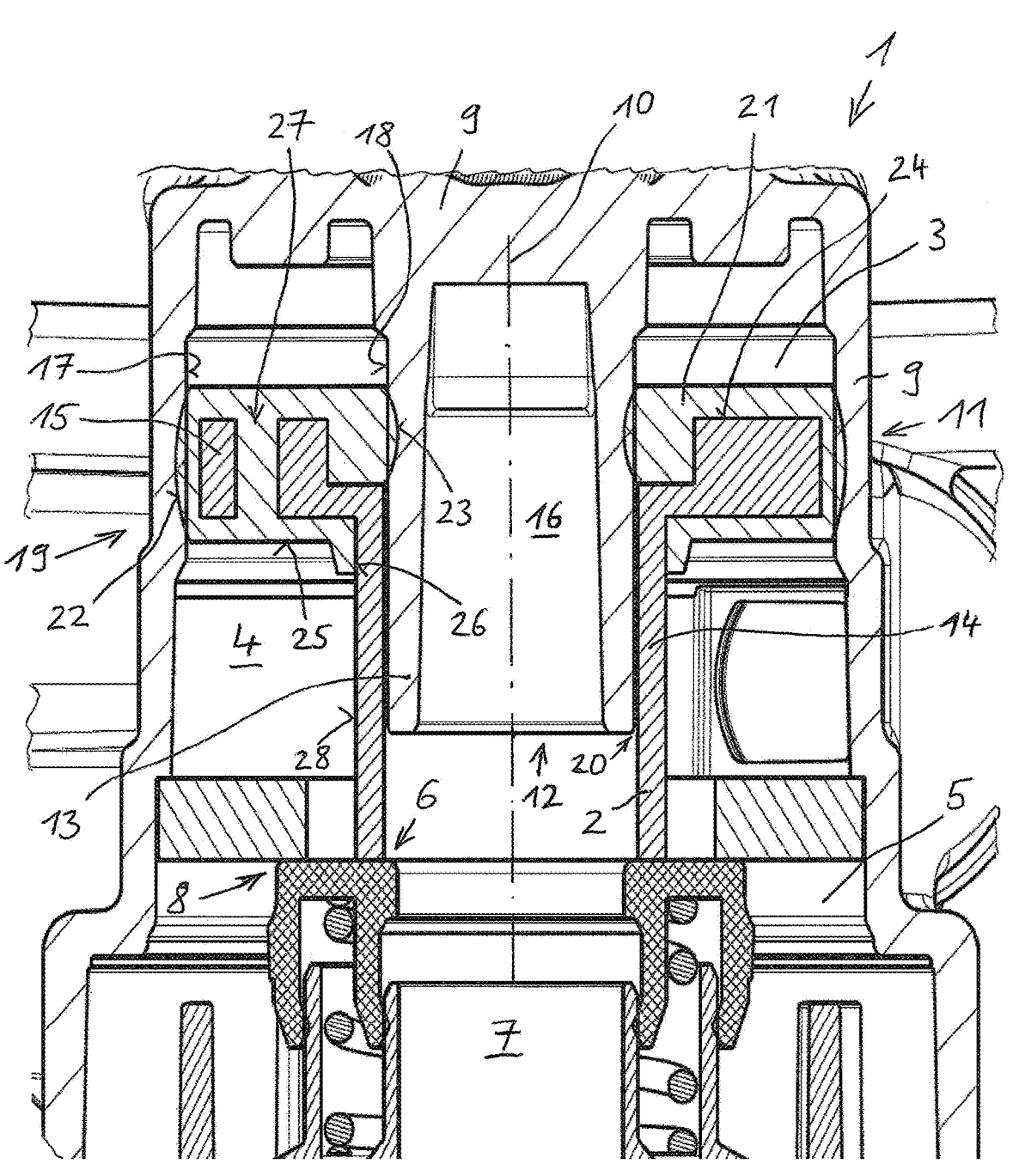
FIG. 1 shows a partial cross section view of a relay valve according to the invention in an advantageous embodiment.

FIG. 1 shows a partial sectional view of the relay valve 1 according to the invention in an advantageous embodiment. The relay valve 1, which is e.g. a pneumatic relay valve 1 in this embodiment, controls large compressed air volumes with small compressed air volumes, thus, e.g. for brake cylinders of a compressed air brake of a vehicle. Thus, the relay valve 1 includes a relay valve piston 2 operating as a control piston, wherein the relay valve piston defines the control chamber 3 on one side, wherein the control chamber is loadable with a controlled pressure through a non-illustrated control connection and the relay valve piston 2 defines an operating chamber 4 on another side which is loadable by an operating pressure provided by a consumer from a pressure medium outlet. An inlet valve 6 is arranged between a venting chamber 5 connectible with a pressure medium source through a pressure medium inlet and an operating chamber 4 connectible through the pressure medium outlet with the consumer. An outlet valve 8 is arranged between the operating chamber 4 and a vent chamber 7 that is connected with a vent leading to the ambient atmosphere. The inlet valve 6 and the outlet valve 8 jointly form a double seat valve actuatable by the relay valve piston 2.

The relay valve piston 2 moves into the operating chamber 4 when the control chamber 3 is loaded with a control pressure. Moving the relay valve piston 2 first closes the outlet valve 8 and subsequently opens the inlet valve 6. This establishes a pressure in the operating chamber 8 which counteracts the control pressure at the relay valve piston 2. The relay valve piston 2 is pushed back against its original movement direction when the pressures acting in opposite directions are in equilibrium. The inlet valve 6 closes without the outlet valve 8 opening, so that the pressure in the operating chamber 4 and below the pressure medium outlet is maintained.

Venting the control chamber 3 moves the relay piston 2 further against its original movement direction, and the outlet valve 8 opens until the pressure in the operating chamber 4 has dropped to a value where a pressure equilibrium at the relay valve piston 2 is provided again and the outlet valve 8 is closed again. When the control chamber 3 is vented completely, the operating chamber 4 and thus also the subsequently connected consumers, e.g., the brake cylinder, are completely vented.

The relay valve 1 includes: a housing 9 and a pressure medium inlet configured at or in the housing 9 and connectible with the compressed air source, the pressure medium outlet connectible with the consumer, the control input, the vent leading to ambient, and the relay valve piston 2 supported in the housing along an axis 10. The axis 10 can represent in particular a central longitudinal axis of the relay valve 1.

The relay valve piston 2 includes a radially outer rim 11 and an inner pass-through opening 12, advantageously centrally arranged, wherein a support tube 13 of the housing protrudes into the pass through opening 12 in order to support the relay valve piston 2 along the axis 10. The relay valve piston 2 advantageously includes a tube section 14 including the pass-through opening 12 and an annular portion 15 that advantageously protrudes radially outward from an end of the tube section 14, wherein a radially outer rim 11 is formed at the annular portion 15. The tubular portion 14 of the relay valve piston 2 is advantageously configured hollow and forms e.g. a portion of a venting channel 16 that is e.g. centrally arranged in the instant embodiment and connected with the venting chamber 7 of the relay valve 1.

The relay valve piston 2 is moveably supported with the radially outer rim 11 at a radially inner wall 17 of the housing 9 and movably supported with a radially inner circumferential surface of its radially inner pass-through opening 12 at a radially outer circumferential surface 18 of the support tube 13. A seal arrangement 19 is additionally provided that seals the radially outer rim of the annular portion 15 of the relay valve piston 2 relative to the radially inner wall 17 of the housing 9 and on the other side relative to the radially outer circumferential surface 18 of the support tube 13 of the housing 9.

The radially inner wall 17 of the housing 9 circumferentially envelops the support tube 13 which is advantageously configured smooth cylindrical at its radially outer circumferential surface and the smooth cylindrical radially outer circumferential surface 18 supports the relay valve piston 2. A narrow annular gap 20 is advantageously provided between the smooth cylindrical radially outer circumferential surface 18 of the support tube 13 and the also advantageously smooth cylindrical radial inner circumferential surface of the tube section 14 of the relay valve piston 2, wherein the narrow annular gap 20 is connected with the venting chamber 7.

The seal arrangement 19 advantageously includes e.g. a single seal element 21 with a first sealing surface 22 and a second sealing surface 23 oriented away from the first sealing surface 22 in particular in a direction perpendicular to the axis 10. The seal element 21 is connected with the annular portion 15 of the relay valve piston 2 and configured to seal the relay valve piston 2 with the first sealing surface 22 relative to the radially inner wall 17 of the housing 9 and with the second sealing surface 23 relative to the radially outer circumferential surface 18 of the support tube 13 of the housing 9.

The first sealing surface 22 and the second sealing surface 23 are in particular dynamic sealing surfaces, because the first sealing surface 22 is moved in particular parallel to the axis 10 relative to the radially inner wall 17 of the housing 9, and the second sealing surface 23 is moved in particular parallel to the axis 10 relative to the radially outer circumferential surface 18 of the support tube 13.

Particularly advantageously, the first dynamic sealing surface 22 seals the control chamber 3 connected with the control input relative to the operating chamber 4 connected with the pressure medium outlet, and the second dynamic sealing surface 23 seals the control chamber 3 relative to the venting chamber 7 connected with the vent.

Figure 2:
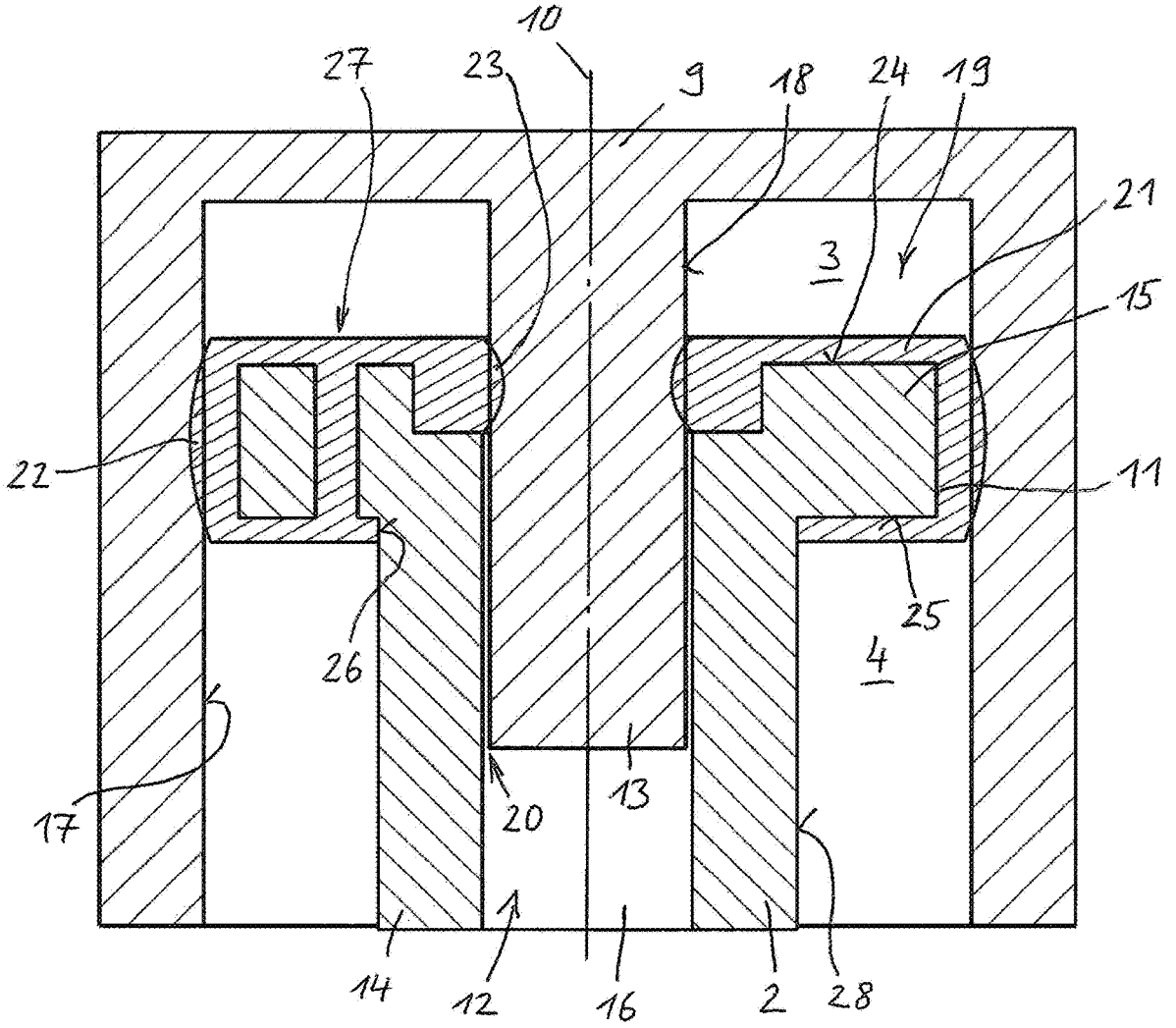
FIG. 2. shows a blown-up detail of FIG. 1
Figure 3:
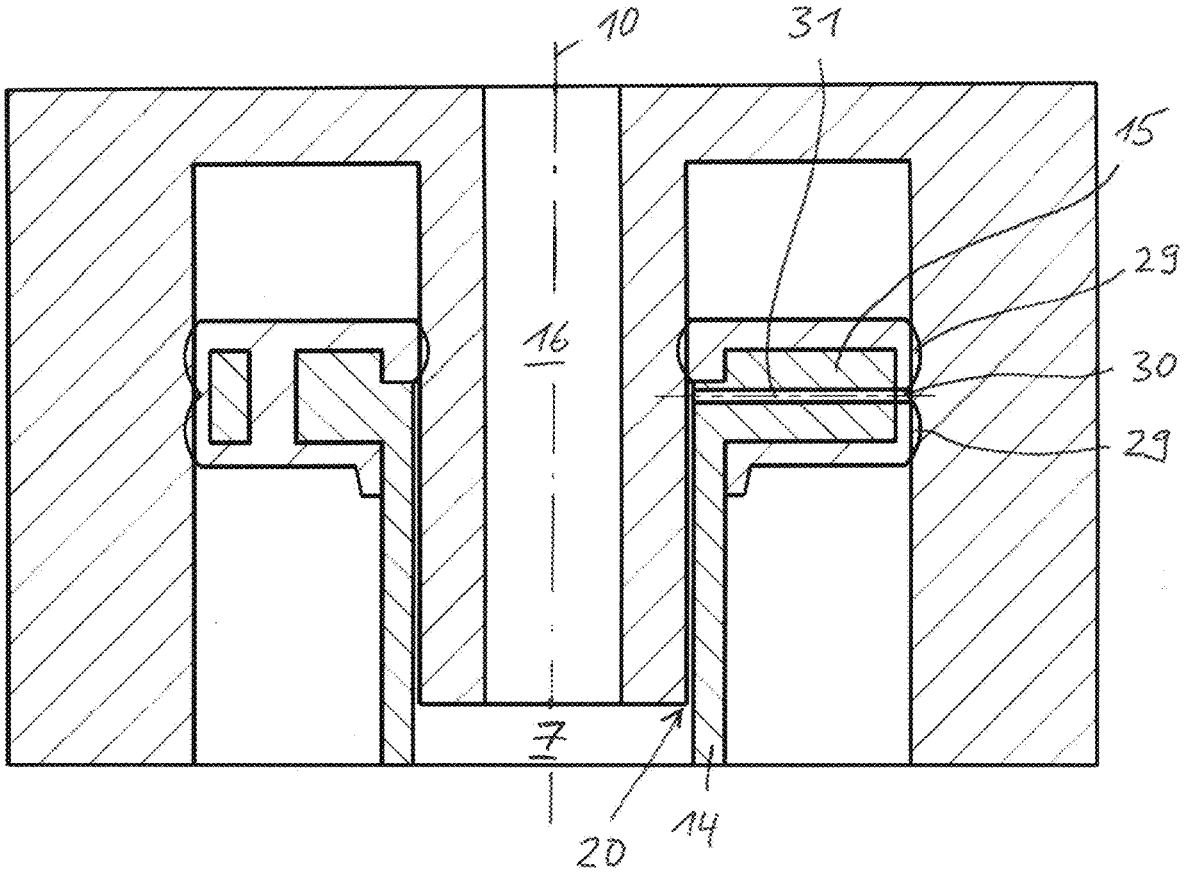
FIG. 3. shows a partial cross sectional view of a relay valve according to the invention in another advantageous embodiment.

The annular portion 15 includes a first face 24 oriented towards the control chamber 3 viewed respectively perpendicular to the axis 10 and a second face 25 oriented towards the operating chamber 4, wherein the seal element 21 covers e.g. at least a portion of the first face 24 and of the second face 25 as evident in particular from FIGS. 1-3. Additionally, the seal element 21 includes a third static sealing surface which is configured and provided to prevent a sub migration of the seal element 21 by compressed air, in particular by compressed air from the operating chamber 4. This third, static sealing surface 26 is supported by the relay valve piston 2 but is advantageously not in contact with the housing 9 and is not moveable relative to the relay valve piston 2. Advantageously, the first sealing surface 22, the second sealing surface 23, and the third sealing surface 26, are arranged at the annular portion 15, essentially at the same level with relative to the axis 10.

Though the first sealing surface 22 and the second sealing surface 23 in FIGS. 1-3 are shown in a simplified manner as pitch circles, seal lips can be configured at this location that radially protrude from the seal element 21 at a slant angle, wherein the seal element 21 advantageously forms a lip seal. Radially protruding at a slant angle means at an acute angle with respect to a plane in a cross-sectional view wherein the plane is arranged orthogonal to the axis 10.

The seal element 21 is advantageously connected with the annular portion 15 of the relay valve piston 2 by positive form locking, and, in particular, this connection is configured without an adhesion enhancement agent. The seal element 21 is provided e.g. as an injection molded part made from an elastomeric material which is encased through injection molding integrally with the annular portion 15 of the relay valve piston 2. Then, the seal element 21 forms an integral one-piece unit together with the relay valve piston 2, wherein the integral one-piece unit can be placed into the housing in a single assembly step and mounted therein.

The seal element 21 is configured as an injection molded part and advantageously provided in one layer viewed in cross section since it is produced in its entirety e.g., in a single injection molding step. Alternatively, the seal element 21 can be configured as an injection molded component in several layers viewed in cross section wherein one respective layer of the plural layers is respectively produced in a separate injection molding step. The multi-layer configuration facilitates using different materials when producing the seal element 21.

The seal element 21 provided as an injection molded component envelops the annular portion 15 of the relay valve piston 2 at least partially in a radial and axial direction with reference to the axis 10 and protrudes e.g. through an opening 27 of the annular portion 15 of the relay valve piston 2, wherein the opening advantageously extends as a pass through opening between the first face 24 and the second face 25. This opening 27 is e.g. parallel with respect to the axis 10. Plural openings 27 penetrated by the seal element 21 can be distributed over the circumference of the annular portion 15 in the illustrated embodiment. These penetrations cause undercuts between the annular portion 15 of the relay valve piston 2 and the seal element 21 viewed in cross section, wherein the undercuts provide positive form locking of the seal element 21 with the annular portion 15 of the relay valve piston 2 as illustrated respectively in the left halves of FIG. 1 through FIG. 3.

As shown in the right half of FIG. 1-FIG. 3, the cross section of the annular portion can also be advantageously provided without this opening in some circumferentially arranged locations. In spite of that positive form locking of the seal element 21 with the annular portion 15 can be provided, thus advantageously in that the annular portion 15 is at least partially enveloped by the seal element or encased by the seal element through injection molding.

As stated supra, the seal element 21 additionally includes the third static sealing surface 26 which is configured and provided to prevent compressed air from seeping under the seal element 21 in a portion of the annular portion 15. In order to prevent this, the third static sealing surface 26 can seal against a radially outer circumferential surface 28 of the tube section 14 of the relay valve piston 2.

FIG. 3 shows a partial sectional view of a relay valve 1 according to the invention in another advantageous embodiment. In this embodiment, the first sealing surface 22 of the seal element 21 includes two sealing lips 29 axially offset from one another in a direction of the axis 10, wherein the sealing lips are illustrated in a simplified manner as pitch circles. An intermediary space 30 between the two sealing lips 29 is connected through an internal channel 31 of the annular portion 15 of the relay valve piston 2, thus e.g. extending transversal to the axis, with the venting chamber 7. Thus, the channel 31 is connected through the narrow annular gap 20 between the radially inner circumferential surface of the tubular portion 15 and the radially outer circumferential surface 18 of the support tube 13 with the venting chamber 7. This connection of the intermediary space 30 between the two sealing lips 29 with the venting chamber 7 improves sealing since the sealing lips 29 arranged at a slant angle are pre-loaded against the radially inner wall by the pressure differential thus created as described supra.

REFERENCE NUMERALS AND DESIGNATIONS

1 relay valve
2 relay valve piston
3 control chamber
4 operating chamber
5 venting chamber
6 inlet valve
7 venting chamber
8 outlet valve
9 housing
10 axis
11 radially outer rim
12 pass-through opening
13 support tube
14 tubular portion
15 annular portion
16 venting channel
17 radially inner wall
18 radially outer circumferential surface
19 seal arrangement
20 annular gap
21 seal element
22 first sealing surface
23 second sealing surface
24 first face
25 second face
26 third sealing surface
27 opening
28 radially outer circumferential surface
29 sealing lips
30 intermediary space
31 internal channel

What is claimed is:

1. A relay valve for a compressed air system of a vehicle, the relay valve comprising:
   a housing including a pressure medium inlet arranged at or in the housing and connectible with a compressed air source, at least one pressure medium outlet connectible with a consumer, at least one control inlet, at least one vent towards an ambient atmosphere, and at least one relay valve piston movably supported in the housing along an axis,
   wherein the relay valve piston includes a radially outer rim and a center pass through opening, wherein a support tube of the housing protrudes into the center pass through opening,
   wherein the relay valve piston is movably supported by the radially outer rim at a radially inner wall of the housing and movably supported by a radially inner circumferential surface of the center pass through opening at a radially outer circumferential surface of the support tube,
   wherein a seal arrangement is provided which dynamically seals the relay valve piston on one side relative to the radially inner wall of the housing and on another side relative to the radially outer circumferential surface of the support tube, wherein the seal arrangement includes at least one seal element including a first sealing surface and a second sealing surface oriented away from the first sealing surface, wherein the at least one seal element is configured to seal the relay valve piston with the first sealing surface relative to the radially inner wall of the housing and with the second sealing surface relative to the radially outer circumferential surface of the support tube.

2. The relay valve according to claim 1, characterized in that the at least one the seal element is connected with the relay valve piston by positive form locking.

3. The relay valve according to claim 1, wherein the at least one seal element is an injection molded part produced from at least one synthetic material and/or at least one elastomeric material, wherein the injection molded part is integrally molded with a portion of the relay valve piston.

4. The relay valve according to claim 3, wherein the at least one seal element is an injection molded part, and
   viewed in cross section formed in a single layer and produced in its entirety in a single injection molding step, or
   viewed in cross section formed in plural layers, wherein one respective layer of the plural layers is respectively produced by a separate injection molding step.

5. The relay valve according to claim 3, wherein the injection molded part
   envelops the portion of the relay valve piston at least partially, and/or
   protrudes into at least one opening of the portion of the relay valve piston or protrudes through the at least one opening.

6. The relay valve according to claim 5, characterized in that at least one opening section of the opening is parallel to the axis.

7. The relay valve according to claim 3, wherein the at least one seal element includes a third sealing surface which is configured to prevent a seeping of compressed air under the at least one seal element.

8. The relay valve according to claim 3, wherein a connection between the at least one seal element and the portion of the relay valve piston includes at least one undercut.

9. The relay valve according to claim 1, wherein the relay valve piston includes a tubular portion including the central pass-through opening and an annular portion that protrudes radially outward from the tubular portion, wherein the radially outer rim is formed at a radial outside of the annular portion.

10. The relay valve according to claim 3,
    wherein the relay valve piston includes a tubular portion including the central pass-through opening and an annular portion that protrudes radially outward from the tubular portion,
    wherein the radially outer rim is formed at a radial outside of the annular portion, and
    wherein in that the annular portion forms the portion of the relay valve piston.

11. The relay valve according to claim 10,
    wherein the annular portion includes a first face and a second face respectively oriented orthogonal to the axis, and
    wherein the at least one seal element covers or envelops at least a portion of the first face and/or of the second face.

12. The relay valve according to claim 11, wherein the at least one seal element forms an elastic stop surface for the relay valve piston when the relay valve piston contacts a section of the housing with the first face and/or with the second face in at least one end position.

13. The relay valve according to claim 9, wherein the tubular portion of the relay valve piston s configured hollow and forms part of a venting channel that is connected with the vent.

14. The relay valve according to claim 1, wherein the first sealing surface and/or the second sealing surface of the at least one seal element includes a sealing lip.

15. The relay valve according to claim 14,
wherein at least the first sealing surface includes two sealing lips arranged offset from one another in a direction of the axis, and
wherein an intermediary space between the two sealing lips is connected to the vent through an internal channel of the relay valve piston.

16. The relay valve according to claim 1, wherein the first sealing surface and the second sealing surface seal
a control chamber connected with the control inlet of the relay valve relative to an operating chamber connected to the pressure medium outlet of the relay valve, and
the control chamber of the relay valve relative to a venting chamber connected with the vent of the relay valve.

17. An electropneumatic module of a compressed air system of a vehicle, the electropneumatic module comprising: the relay valve according to claim 1.

18. A compressed air system of a vehicle, comprising: the electropneumatic module according to claim 17.

19. A vehicle, comprising: the compressed air system according to claim 18.

* * * * *